United States Patent [19]

Dorman

[11] 4,452,666

[45] Jun. 5, 1984

[54] METHOD OF MAKING A MULTI-CHANNEL TRANSPARENT MICROFILM JACKET

[75] Inventor: Isidore Dorman, Whitestone, N.Y.

[73] Assignee: NB Jackets de Puerto Rico, Caguas, P.R.

[21] Appl. No.: 159,188

[22] Filed: Jun. 13, 1980

Related U.S. Application Data

[60] Division of Ser. No. 792,109, Apr. 29, 1977, which is a continuation of Ser. No. 463,814, Apr. 24, 1974, abandoned.

[51] Int. Cl.³ .............................................. B29D 7/02
[52] U.S. Cl. ............................... 156/243; 156/244.12; 156/244.18; 156/244.19; 156/244.22; 156/244.27; 156/244.11; 40/159
[58] Field of Search .............. 156/243, 244.11, 244.12, 156/244.18, 244.19, 244.22, 244.27; 40/159

[56] References Cited

U.S. PATENT DOCUMENTS

| | | | |
|---|---|---|---|
| 1,959,460 | 5/1934 | Crossan | 156/244.12 |
| 3,008,862 | 11/1961 | Haine et al. | 156/244.22 |
| 3,238,655 | 3/1966 | Engelstein | 40/159 |
| 3,736,680 | 6/1973 | Dahl | 40/159 |

Primary Examiner—Caleb Weston
Attorney, Agent, or Firm—Michael Ebert

[57] ABSTRACT

A method for producing a multi-channel transparent jacket to accommodate microfilm strips having a given thickness, the jacket being constituted by top and bottom rectangular panels of flexible synthetic plastic material and plastic ribs formed in situ along parellel lines between the panels and integrally bonded thereto to maintain the panels in spaced relation and to define open-ended channels whose width is substantially equal to the width of the strips. In the method, extruded molten streams of polyester material compatible with the material of the panels are directed onto the surface of a first web of panel material in parallel paths thereon, the first web being advanced concurrently with a second web of panel material into combining rolls which act to compress and flatten the streams to produce the in situ ribs, the combined web then being sectioned into individual jackets.

2 Claims, 8 Drawing Figures

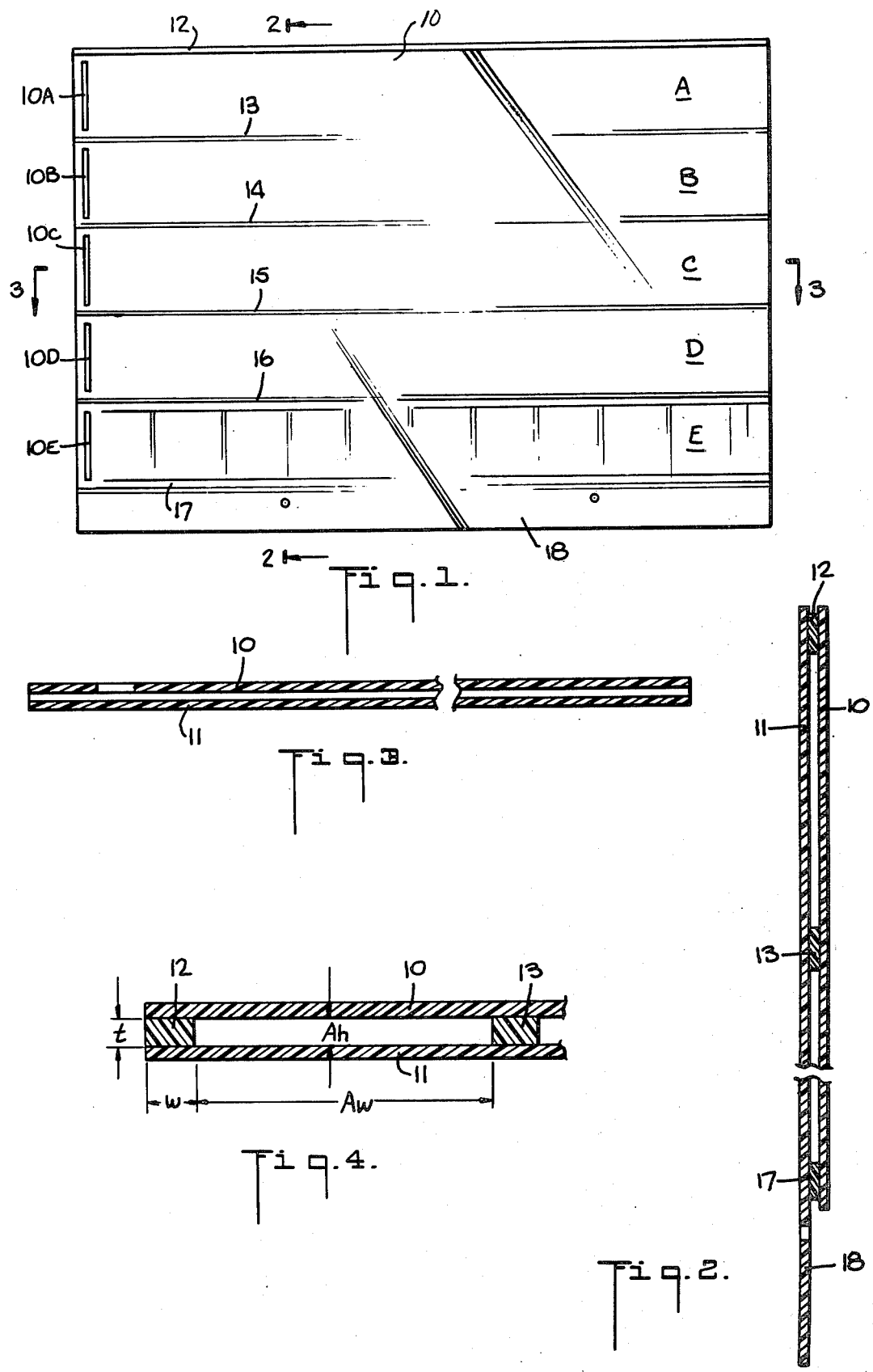

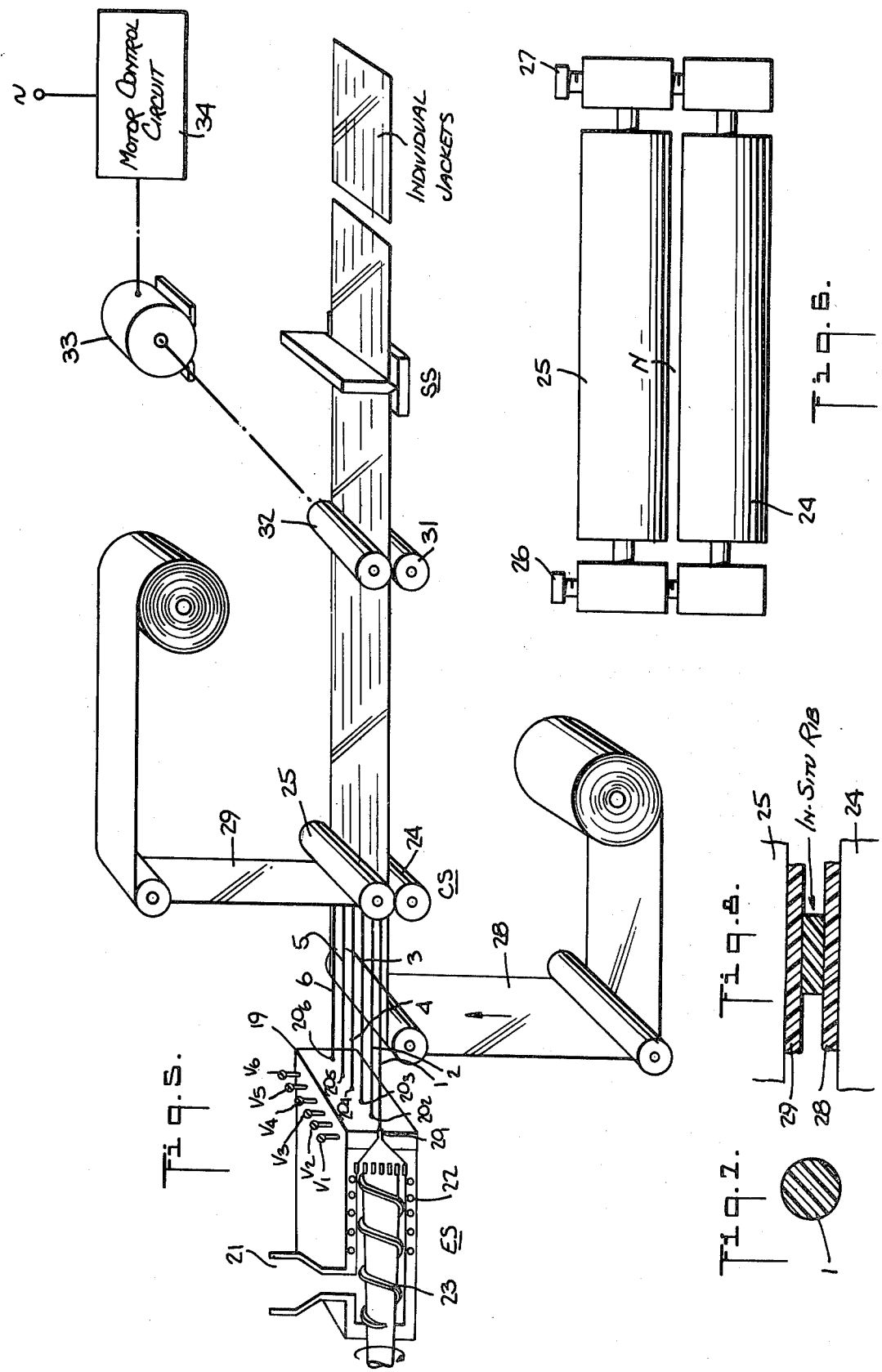

METHOD OF MAKING A MULTI-CHANNEL TRANSPARENT MICROFILM JACKET

RELATED APPLICATIONS

This application is a division of my copending application Ser. No. 792,109, filed Apr. 29, 1977, which in turn is a continuation of my application Ser. No. 463,814, filed Apr. 24, 1974 (abandoned).

BACKGROUND OF THE INVENTION

This invention relates generally to multi-channel jackets for microfilm, and more particularly to microfiche jackets adapted to accommodate thin microfilm strips as well as to a technique for manufacturing such jackets.

The Engelstein patent, U.S. Pat. No. 3,238,655, entitled "Microfiche Master" discloses a microfiche master composed of a transparent jacket formed by two transparent plastic panels laminated together by ribs which are spaced to define a series of parallel channels or chambers adapted to accommodate microfilm strips. The loaded, multi-chambered jacket functions as a microfiche master from which reference copies may be made. This is effected by contact-printing through the front panel which is quite thin, the back panel being thicker to impart body to the jacket. Such microfiche masters are highly useful in storing and disseminating information.

The Engelstein patent points out that to facilitate contact-printing it is important not only that the top panel of the jacket be thin to minimize the separation between the sensitive film of the contact-printer and the microfilm strip in the jacket so as to obviate a loss of optical definition, but it is also essential to avoid any space between the flim strip and the overlying top panel. Since this spacing is determined by the ribs which separate the top panel from the bottom panel of the jacket, the thickness of the ribs is made substantially equal to the thickness of the standard microfilm which is 5.5 mils. Thus the film strip is snugly received within the chamber.

The recent trend in microfilm technology is toward thinner films of 3 mils or less; for with a thinner film a greater footage of film may be carried on a standard reel, thereby enlarging the capacity of the microfilm system and reducing storage costs. But this creates certain problems in providing microfiche jackets suitable for thin microfilm; for then the ribs must be much thinner than those heretofore employed.

In the jacket disclosed in the Engelstein patent, preformed plastic or paper ribs are adhesively secured to the top and bottom panels. Hence the spacer ribs act as carriers for an adhesive agent to effect lamination. When the requirement is for very thin ribs to match very thin microfilm, it becomes commercially impracticable to manipulate the thin ribs in fabricating the jacket.

A known alternative approach to producing microfilm jackets without preformed ribs is to define the channels by an ultrasonic sealing technique wherein sealing is carried out along parallel lines, causing the top panel to belly out with respect to the bottom panel of the jacket, thereby defining the necessary channels or chambers for receiving the microfilm.

One drawback to this approach is that in ultrasonically sealing polyester for microfiche jackets, the heat created by the sealing action impairs the polymeric properties of the panel material and weakens the jacket, making it relatively easy to tear or fold the jacket along the weakened sealing lines. Moreover, with an established jacket format, the chambers defined by linear seals are significantly broader than the width of the film strips received therein so that the strips are loosely rather than snugly held.

SUMMARY OF THE INVENTION

In view of the foregoing, it is the main object of this invention to provide a transparent multi-channel jacket for microfilm wherein the channels are defined by in situ ribs which are integral with the panels of the jacket and serve to maintain a desired spacing therebetween.

More particularly, it is an object of this invention to provide a multi-channel jacket which is suitable for receiving and storing very thin microfilm strips, the jacket being formed by top and bottom panels of "Mylar" polyester film which are separated by integral ribs of moldable synthetic plastic material to define the channels.

Also an object of the invention is to provide a machine capable of economically and efficiently mass-producing a jacket of the above-type, the machine being adjustable to create in situ ribs of a desired thickness whereby the jacket may be tailored to accommodate films of any commercially-available thickness, ranging from very thin to heavy gauge microfilm.

A significant feature of the invention is that the in situ ribs are formed by extruding a set of molten streams of plastic material in parallel paths, the streams in their molten state being fed between webs of transparent panel material advancing toward combining rolls, whereby the streams are compressively bonded to the webs and are integrated therewith to define ribs whose thickness is precisely determined by the adjustable nip of the combining rolls and whose width depends on the cross-sectional area of the streams, which area is controllable. Thus the same machine may be used to produce jackets for accommodating microfilm strips in a range of gauges, without having to change the rib supply as in prior machines wherein each rib is preformed by a plastic or paper ribbon drawn from a reel.

Briefly stated, these objects are attained in a transparent multi-chamber jacket suitable for producing microfiche masters or for other applications requiring the storage and projection of microfilm strips, the jacket being constituted by two panels of transparent, flexible plastic material preferably of polyester Mylar film, a plurality of parallel in situ ribs of moldable synthetic plastic being interposed between said panels and being integral therewith to maintain the panels in spaced relation to define open-ended chambers for receiving microfilm strips, the ribs having a thickness substantially equal to the thickness of the strips whereby the chambers of the jacket are of a thickness substantially matching that of the film inserted therein.

OUTLINE OF THE DRAWINGS

For a better understanding of the invention as well as other objects and further features thereof, reference is made to the following detailed description to be read in conjunction with the accompanying drawings wherein:

FIG. 1 is a plan view of a multi-channel jacket in accordance with the invention;

FIG. 2 is a transverse section taken in the plane indicated by line 2—2 in FIG. 1;

FIG. 3 is a longitudinal section taken in the plane indicated by line 3—3 in FIG. 1;

FIG. 4 is a detail of the jacket;

FIG. 5 is a schematic diagram of a machine for mass-producing the jacket;

FIG. 6 is an elevational view of the combining station rolls included in the machine:

FIG. 7 is a section taken through a molten stream before compression; and

FIG. 8 is a section taken through the same stream after compression.

DESCRIPTION OF INVENTION

Microfiche Master

Referring now to FIGS. 1, 2 and 3, showing a microfiche master in accordance with the invention, the master is constituted by a transparent multiple-chamber jacket having parallel channels or chambers A, B, C, D, and E. Contained in section E is a microfilm strip or chip, the strip or chip having been inserted by means of a suitable reader-filler machine.

The microfilm strips need not be inserted one at a time, and in practice, additional strips may be added to supplement an existing record. For example, if each chamber has a capacity of ten film frames, then if the first inserted strip is four frames long, there is still room for six more frames. It is important, however, that the second film chip or strip not override the first, for then the microfiche would not be usable. Hence, one reason why it is vital that strips be snugly contained in the channels is in order to prevent a later-inserted film strip from riding over a previously-inserted strip.

The jacket is comprised of two transparent rectangular panels 10 and 11 in superposed relation, the panels being formed of clear, flexible plastic material, preferably a polyester or Mylar (polyethylene terephthalate) film. Polyester material is advantageous because of its exceptional clarity, high strength and dimensional stability.

Interposed between the top and back panels and integral therewith are longitudinally-extending in situ ribs 12, 13, 14, 15, 16 and 17. These ribs are of the same or of a similar material as the panels and lie in parallel relation to define chambers A to E which are open at either end. In practice, the in situ ribs may be formed of polyvinyl chloride, polyethylene or other suitable synthetic plastic material. The chambers are of like width to accommodate microfilm strips of a given size, such as 16 mm film.

The back panel 10 is somewhat wider than top panel 11 to provide a marginal extension which is coated with translucent coating 18 for titling the microfiche master. This title will be reproduced in contact-printing, because of the translucence of the coating.

To facilitate insertion of microfilm strips or chips, a series of generally rectangular slots 10A to 10E are cut across back panel 10 adjacent the front end of the chamber openings. Top panel 11 is preferably exceptionally thin (i.e., about one mil or less) to facilitate contact-printing, whereas back panel 10 is preferably of heavier gauge transparent material (i.e., 3 to 5 mils) to give body to the microfiche.

The ribs are of substantially the same thickness as the inserted microfilm strips, or slightly thinner, so that the sensitive duplicating film is virtually in contact with the microfilm inserts when contact-printing takes place. When the microfilm strip to be inserted is relatively thin (i.e., 3 mils or less), the ribs need to be correspondingly thin.

Referring now to FIG. 4, we shall now consider the parameters involved in establishing within the jacket formed by panels 10 and 11, a channel A whose width $A_w$ is slightly wider than the width of the microfilm strip to be inserted therebetween, and whose height $A_h$ is substantially the same as the thickness of the strip. The channel width $A_w$ is determined by the distance between ribs 12 and 13, whereas the channel height is determined by the thickness of these ribs.

When making jackets with pre-formed ribs made of adhesively-coated paper or plastic ribbons, one has merely to supply to the jacket-forming machine a set of ribbons having the desired width and thickness and to maintain the proper spacing therebetween; these ribbons being adhered to the panels. But in the present invention, the ribs are not pre-formed but are created in situ by introducing between the advancing webs of panel material parallel filaments or streams of molten plastic, which streams are compressively bonded to the webs in combining rolls which flatten the streams to an extent transforming the streams into integral ribs having the desired thickness and width.

The Machine

A machine in accordance with the invention for making a multichamber jacket of the type shown in FIG. 1 having in situ ribs is illustrated in FIG. 5. The machine consists of an extruding station ES, a combining station CS and a sectioning station SS. The extruding station includes a manifold die head 19 having an array of output nozzles $20_1$, $20_2$, $20_3$, $20_4$, $20_5$ and $20_6$ from which are extruded six parallel filaments or streams 1 to 6 of molten plastic material, preferably having pigment therein to produce colored ribs. The number of operative nozzles and the spacing therebetween depends on the rib requirement of the jacket being produced, and the showing herein is merely by way of example. Each nozzle is controlled by a suitable needle valve $V_1$ to $V_6$.

Except for the manifold head, the extruder is of the conventional type and includes an input hopper 21 to receive raw stock in particulate form which stock may be polyester or any other suitable synthetic plastic material. The stock is rendered molten by heaters 22, the molten material is advanced toward the manifold head by a motor-driven rotating screw 23 and is forced through the dies at a controllable rate.

As shown separately in FIG. 6, the combining station CS is constituted by a lower roll 24 and a complementary upper roll 25 whose spacing relative to the lower roll is adjustable by means of spacing controls 26 and 27 included in the bearings for the upper roll, whereby the nip N between rolls may be set to provide a desired degree of compression.

Drawn from a supply reel and fed into the combining rolls is a lower web 18 of polyester-film material suitable for forming the bottom panels of the jacket. Concurrently drawn from a supply reel is an upper web 29 of the same material but of a different gauge suitable for forming the top panels of the jacket.

Lower web 28 is guided by an idler input roll 30, the web drawn from the supply reel passing over this roll and advancing in a horizontal plane toward combining roll 24 and 25 and continuing from there in the same path toward drive rolls 31 and 32.

Upper web 29 drawn from the overhead supply comes down vertically to enter combining roll 25, after which it is conducted in a horizontal path toward drive rolls 31 and 32.

Thus the horizontal surface of lower web 28 in the forward space between idler roll 30 and combining rolls 24 and 25 is exposed and functions as a receiving table for the streams 1 to 6 emerging from nozzles $20_1$ to $20_6$. Die head 19 is horizontally spaced from idler roll 30 so that the portion of extruded streams 1 to 6 extending between the nozzles and the leading edge of the receiving table form an unsupported bridge.

Drive rolls 31 and 32 are operated by a motor 33 whose speed is controlled by a suitable motor control system 34, whereby the motor speed can be set to advance the webs at a rate somewhat greater than the rate at which the streams are extruded. This difference in speed acts to stretch the bridge portion of the streams in taffy-like fashion and to elongate the streams so that the cross-sectional area of each stream laid down on the lower web is somewhat smaller than the area of the streams emerging at the nozzle outputs. This stretching action serves to prevent the unsupported streams in the bridge thereof from sagging. The stretching action also functions to maintain the parallel relation of the streams at the receiving table, for the molten streams are unguided.

The molten streams laid down on the exposed lower web have a generally circular cross-sectional form, as shown in FIG. 7. But when the streams are sandwiched between the upper and lower webs and are compressed by combining rolls 24 and 25, the streams are flattened out, as shown in FIG. 8, to an extent determined by the adjusted nip opening N of these rolls. Hence, the thickness of the ribs is determined by the nip opening, but the width of the ribs depends on the cross-sectional area of the streams.

For example, with a cross-sectional area as shown in FIG. 7, the resultant width of the rib is that produced in FIG. 8, whereas if the nip opening were made smaller to produce a thinner rib, then for the same cross-sectional stream area, the rib would be broader. In jackets for film strips of standard width, it is essential that the ribs all have the same width regardless of whether the ribs are thin to match thin microfilm strips or thicker to match heavier film strips. Hence in setting the machine for making ribs of a given thickness, one must take into account and adjust the cross-sectional area of the molten streams so that the ribs formed in situ have the desired width as well as the desired thickness. This cross-sectional area depends on the nozzle orifice, the rate of extrusion as determined by the rotating extruder screw, as well as the valve setting and the speed at which the webs are advanced.

The molten streams are compressively bonded to the web in the combining rolls to define the desired in situ ribs which proceed to cool, harden and integrate with the webs in their travel from the combining rolls 24 and 25 to drive rolls 31 and 32. From these rolls, the combined webs then enter the sectioning station SS where the web is sliced into individual jackets all having the same length. To provide the necessary entry slots, the bottom web is periodically notched at the appropriate positions.

Thus the machine produces the ribs in situ and does away with the need for pre-formed ribs in ribbon form and the problems incident thereto; for ribbons must not only be carefully guided, but they also must have adhesive coatings applied thereto to effect bonding of the ribbons to the webs.

Moreover, as previously stressed, one cannot, as a practical matter, make jackets with very thin preformed ribs; whereas with the present invention, the in situ ribs may be of any desired thickness, ranging from the extremely thin to the very thick.

The reason why it is commercially impractical to manufacture jackets of the type disclosed in the Engelstein patent, in which the pre-formed ribs are adhered to the panel with thin ribs to match thin microfilm strips of 3 mils or less, will now be explained in greater detail.

The top panel included in the transparent multi-channel Engelstein patent as well as in the present specification is preferably Mylar, polyester film made from polyethylene terephthalate. In conventional jackets, this panel is usually 4 inches wide, whereas the width of the ribs which join the top panel to the back panel is 1/16th of an inch wide. Despite the fact that the four-inch wide web from which the top panel is made has a thickness of one mill or less, no difficulty is experienced in handling this relatively broad web; for all that need be done in the course of manufacture is to transport this web into combining rolls where it is joined by ribs to the bottom panel web.

When the pre-formed ribs are of paper or plastic of the type disclosed in the Engelstein patent or in my prior patent, U.S. Pat. No. 3,533,439 (Dorman), in order to laminate these ribs to the panels, they must be coated with a hot-melt adhesive; that is, a fast-drying, nonvolatile adhesive made of synthetic resin and a plasticizer and applied hot in the molten state.

In making a jacket of the Engelstein or Dorman patent type, these pre-formed ribs are produced by first passing a broad paper or plastic web through a hot-melt bath, after which the web-coated web is run through a dryer. When the hot-melt coating is dry, the coated web then goes through a slitter to produce coated ribs of the desired width; i.e., 1/16th of an inch. These narrow, fragile ribs or ribbons must then be sent through a re-activating oven to melt the adhesive coating thereon prior to lamination of the ribs to the upper and lower panel webs in the combining rolls. In the oven, the conditions of heat and tension necessary for precise control makes this a critical step in the process.

When these ribbons have a thickness of about 6 mils equal to the thickness of standard microfilm, they can be handled in the manner described above. But the use of paper ribbons in a lesserthickness (3 mils or less) suitable for a jacket adapted to receive thin microfilm strips is not feasible; for these ribbons are too weak to handle without a constant risk of rupture. And when working with plastic ribs made of Mylar polyester film, other problems are encountered for in passing such plastic ribs through a re-activating oven at the temperature required to melt the heat-activatable adhesive coating thereon, this temperature is critically close to the softening point of the polyester. This causes distortion and stretching of the Mylar rib material and results in an unsatisfactory product.

Hence while no difficulty is experienced in handling a much thinner top panel web, serious problems are encountered in manipulating adhesive-coated, preformed ribs of paper or plastic when these ribs are about 3 mils thick or less. These problems were found to be unsurmountable; for the ribs are much narrower than the thinner panels webs, and the need to apply a hot-melt adhesive thereto, to dry this adhesive and to reactivate the adhesive brings into play many troublesome handling procedures.

Moreover, there is no other practical technique for bonding pre-formed plastic ribs to Mylar panels, for Mylar lacks heat sealability characteristics. While adhesives are available for laminating Mylar to itself or other materials, the use of adhesives in laminating thin plastic ribs to Mylar panels is precluded for the reasons set forth above.

These problems are overcome in the present invention by creating ribs formed of polyester or other suitable synthetic plastic material, in situ, streams of rib material in molten form being extruded and being sandwiched between the top and back panel webs in combining rolls, whereby the ribs are formed in place and fused to the panels, the resultant ribs being integrally-bonded to the panels to form a unitary jacket structure free of adhesive or any other bonding agent.

While there has been shown and described a preferred embodiment of a multi-channel transparent microfilm jacket in accordance with the invention, it will be appreciated that many changes and modifications may be made therein without, however, departing from the essential spirit thereof.

I claim:

1. A method of producing individual multi-channel transparent jackets for accommodating microfilm strips having a predetermined thickness and width, each jacket being composed of front and rear rectangular panels in superposed relation formed of flexible transparent polyethylene terephthalate film having predetermined polymeric properties, the method comprising the steps of:

(A) directing a plurality of spaced extruded molten streams of moldable polyester material compatible with the material of the panels and having a predetermined cross-sectional area onto the surface of a first web formed of panel material in path thereon which are parallel to the longitudinal axis of the web and have spacings therebetween to define said multi-channels:

(B) advancing said first web carrying said streams concurrently with a second web of panel material into combining rolls having an adjustable nip; said second web having a thickness no greater than about one mil to form individual jackets suitable for contact printing, said first web having a thickness substantially greater than that of the second web sufficient to impart body to said web;

(C) adjusting said nip with reference to the cross-sectional area of the streams to effect compression and flattening thereof between said webs to a degree forming in situ ribs extending longitudinally along each of said webs which are spaced from each other to create channels whose width is substantially equal to that of the microfilm strips and having a thickness substantially equal to the thickness of the microfilm strips and being integrally bonded to each of said webs to create a unitary combined web free of adhesive and other bonding agents wherein said polymeric properties are unimpaired, said ribs maintaining said webs in parallel planes; and (D) transversely sectioning said combined web to form open-ended channels in a stip-receiving condition, thereby defining said individual jackets.

2. The technique as set forth in claim 1, wherein said streams are extruded at a controlled rate from a station horizontally displaced from the receiving surface of said first web whereby said streams form an unsupported bridge between the station and the surface, said webs being advanced at a greater rate than the rate of extrusion, thereby stretching and elongating said streams to maintain the parallel relation thereof and to sustain said bridge.

* * * * *